Dec. 14, 1965 W. H. B. SMITH 3,222,808
SHOTGUN FRAME AND BLOCK ASSEMBLY
Original Filed Dec. 2, 1959 4 Sheets-Sheet 1
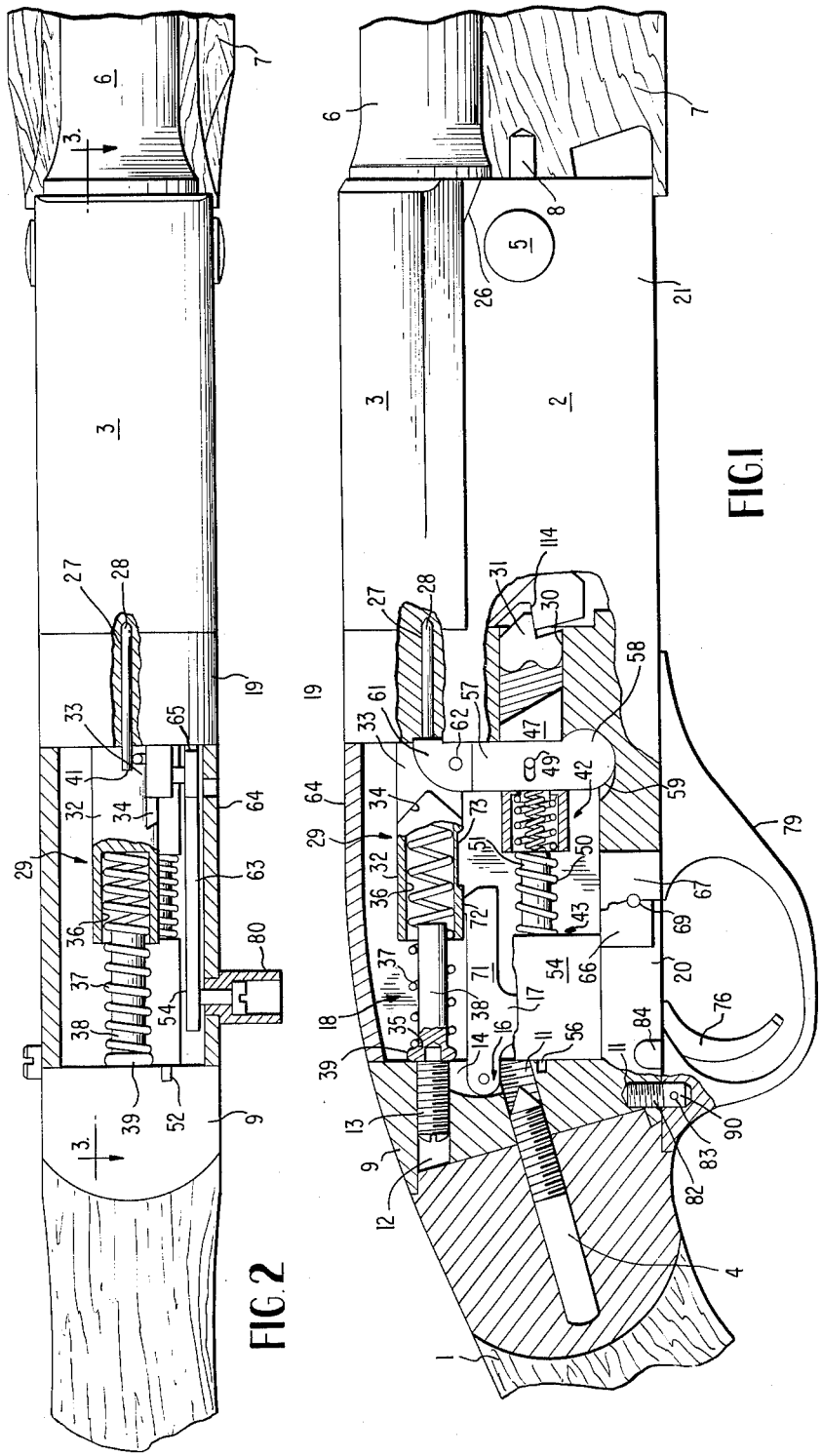

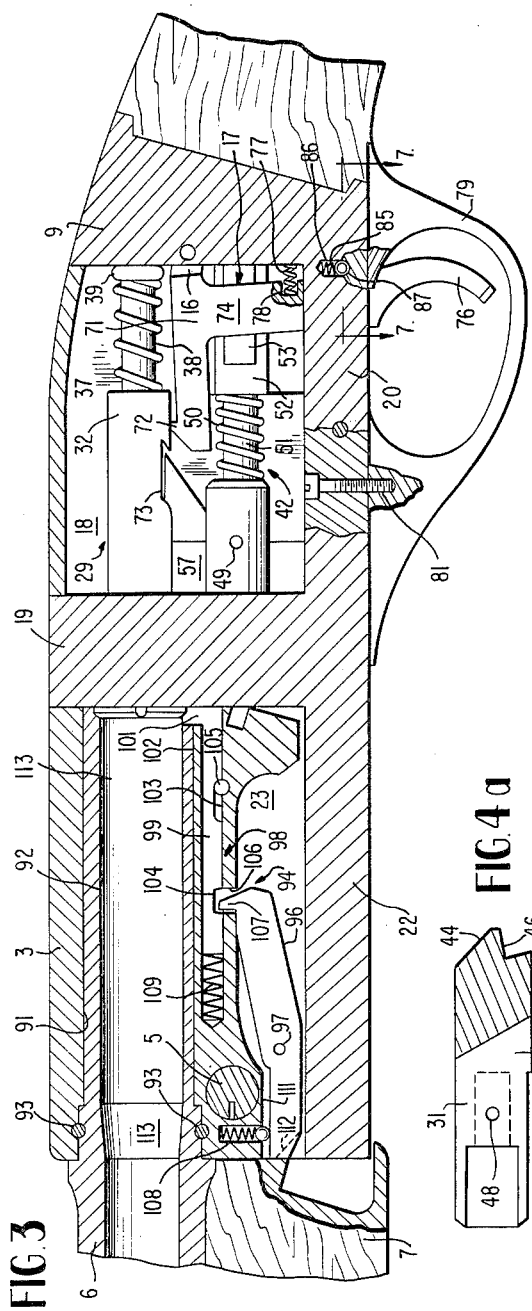

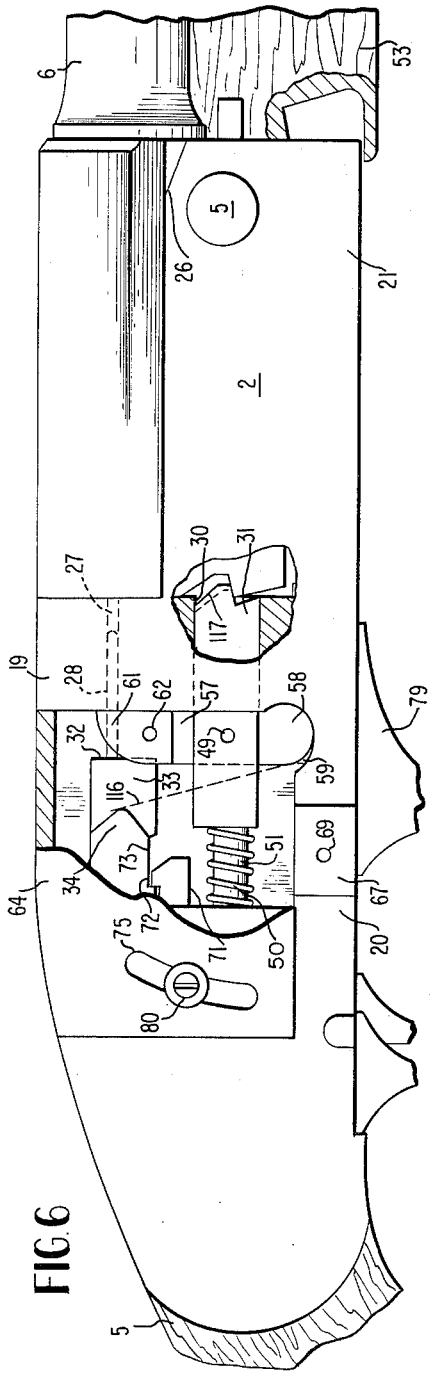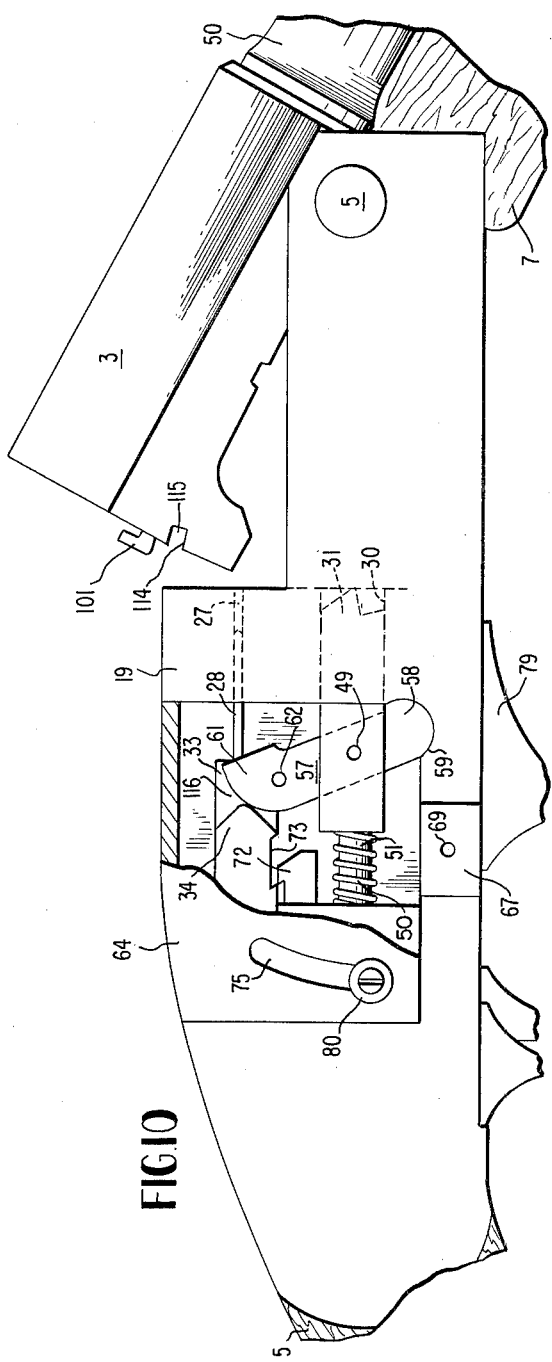

Dec. 14, 1965 W. H. B. SMITH 3,222,808
SHOTGUN FRAME AND BLOCK ASSEMBLY
Original Filed Dec. 2, 1959 4 Sheets-Sheet 4

United States Patent Office 3,222,808
Patented Dec. 14, 1965

3,222,808
SHOTGUN FRAME AND BLOCK ASSEMBLY

Walter H. B. Smith, deceased, late of New York, N.Y., by Katherine B. Groves, executrix, New York, N.Y.; Alice Denhoff, substitute executrix of said Walter H. B. Smith, deceased
Original application Dec. 2, 1959, Ser. No. 856,751, now Patent No. 3,077,045, dated Feb. 12, 1963. Divided and this application May 11, 1962, Ser. No. 199,553
2 Claims. (Cl. 42—44)

This application is a division of application Serial No. 856,751, filed December 2, 1959, now U.S. Patent No. 3,077,045, granted February 12, 1963.

The present invention relates to shotguns and more particularly to a breech-loaded, single-shot, single barrel shotgun having the weight, feel and appearance and utilizing many of the parts of pump action or automatic shotguns.

In educating the beginner in use of guns, it is a common practice to train him on a manually operated single-shot rifle or shotgun, as the case may be, until he becomes throughly familiar with the range and capabilities of the particular class of weapon under consideration. The diffculty with such a procedure, and this is particularly true with regard to shotguns, is that the guns now available for beginners are different in balance, weight and appearance and in actual operation from the weapons which the individual, once he is trained, will be called upon to utilize. Therefore, even though a beginner may be trained insofar as the general capabilities of a particular class of weapons are concerned, once he graduates to the more standard weapons of that class, he must relearn many of the techniques which he developed while utilizing the beginner's gun. Specifically, where there are differences in weight, and balance, he must accustom himself to these new physical features and where the locations of the operating members are different, he must become accustomed to the new locations so that it becomes a matter of routine to reach for them at their proper location.

In addition to the difficulties which are encountered by the beginner in consequence of the beginner's gun being quite different in most respects from the weapons he will eventually employ, the provision of two weapons which are different in all material respects is uneconomical to the manufacturer. The beginner's gun, as indicating above, normally differs in weight, size and balance from the more sophisticated models of the same class of weapons and therefore necessitates the production of different barrels, different stocks and requires not only the production of these members, but also the stocking of more parts than might otherwise be necessary.

It is an object of the present invention to provide a single shot, single-barrel, shotgun, particularly designed for beginners, which has the appearance, weight and balance of the pump action and automatic shotguns.

It is another object of the present invention to provide a single barrel shotgun for beginners which may utilize the barrels and stocks of pump action or automatic shotguns.

It is another object of the present invention to provide an extremely economical single-shot, single barrel shotgun of economical design which may utilize the barrels and stocks of the more sophisticated guns of this class and which has many of its operating parts in the same locations as the corresponding parts on the automatic and pump action shotguns.

It is another object of the present invention to provide a single-shot, single-barrel shotgun having a breech block which may accept various gauge shotgun barrels.

It is another object of the present invention to provide a single-shot, single-barrel shotgun of extremely simple design which permits visual fittting of all members thereby to lessen manufacturing costs.

It is another object of the present invention to provide a singl-shot, single-barrel shotgun which may be disassembled into two main sub-assemblies that include in the one assembly the barrel and breech block and in the other assembly the action and the stock.

It is yet another object of the present invention to provide a lever action cocking assembly which renders the cocking action extremely easy.

It is another object of the present invention to provide a shotgun having a cocking lever that also serves to unlock the breech by withdrawing a locking bolt which normally engages the breech block.

It is another object of the present invention to provide a shotgun wherein the cocking lever also serves to unlock the breech block and in which the sear of the trigger engages and holds a strike assembly before the breach block is unlocked.

It is another object of the present invention to provide a shotgun having a safety mechanism which prevents the firing pin from contacting a shell unless the breech block is locked in closed position.

It is another object of the present invention to provide a single-shot, single-barrel shotgun having a cross-safety which may be removed without taking the finger from the trigger or removing the hand from its normal position when the finger is engaging the trigger.

It is yet another object of the present invention to provide a single-shot, single-barrel shotgun having an ejector mechanism which ejects cartridges only when the breech is fully open.

It is another object of the present invention to provide a single-shot, single-barrel shotgun in which an action cover may be readily removed to expose all working parts of the shotgun.

It is another object of the present invention to provide a single-shot, single-barrel shotgun utilizing a striker tension adjusting screw for developing tension in the striker only after it has been assembled in the action so that the striker compression spring is under only light compression when the mechanism is being assembled.

It is yet another object of the present invention to provide a single-shot, single barrel shotgun having a straight line movement of the firing mechanism.

It is yet another object of the present invention to provide a trigger suspension mechanism for a shotgun which may be readily mounted and which is mounted in such a way as to optimize the mechanical advantage of the system so that the movement required for firing of the gun is minimized.

It is another object of the present invention to provide a single-shot, single-barrel shotgun of unusually low cost and of extremely simple design.

The above and still further objects, features and advantages of the present invention will become apparent upon consideration of the following detailed description of one specific embodiment thereof, especially when taken in conjunction with the accompanying drawings, wherein:

FIGURE 1 is a vertical view partly in section of the right side of the shotgun of the present invention;

FIGURE 2 is a top view partly in section of the shotgun of the present invention;

FIGURE 3 is a sectional view taken on the line 3—3 of FIGURE 2;

FIGURES 4a and 4b are respectively side and top views in section of the bolt of the present invention;

FIGURES 5a and 5d are front and side elevation views respectively of the action cover of the present invention;

FIGURE 6 is a side view in elevation of the action in the cocked position;

FIGURE 10 is a side view in elevation of the action of the present invention in the block released position of the various members of the shotgun of the invention.

Figure 7:
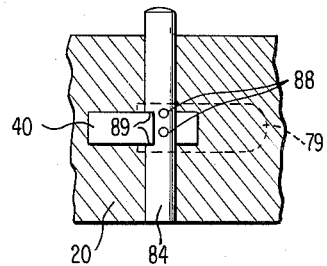
FIGURE 7 is a view taken along line 7—7 of FIGURE 3.

Referring specifically to FIGURES 1 through 3 of the accompanying drawings, the shotgun of the present invention, comprises a frame member 2, in which is assembled the action of the invention, a stock 1 secured to the frame 2 by means of a stock bolt 4, a block 3 pivotally secured at its forward end to the frame 2 by means of a hinge pin 5, a barrel 6 seated in and secured to the block 3 and a forearm 7 suitably secured to the barrel 6 and maintained in alignment with the frame 2 by means of a forearm stud 8.

The frame 2 has a generally vertical rear wall 9 having an inclined threaded aperture 11 for receiving the stock bolt 4, a horizontally disposed threaded aperture 12 arranged above the aperture 11 for receiving a main spring screw 13, and a centrally disposed arcuate recess 14 for receiving a rearwardly extending lobe 16 of a trigger 17. Arranged immediately forward of the rear wall 9 is a rectangular recess 18 defined by a bottom wall 20 and a vertical front wall 19, and across the width of the frame 2. The wall 19 serves to separate the action of the shotgun, disposed in the rectangular recess 18 from the block assembly which is arranged forwardly of the wall 19. The portion of the frame 2 disposed forwardly of the wall 19 constitutes a U-shaped channeled member 21 defined by a bottom wall 22 and upstanding side walls 23 and 24. The forward portions of the walls 24 starting at about the approximate location of the hinge pin 5 are tapered downwardly as at 26 for purposes to be described subsequently.

The forward wall 19 is provided with an upper longitudinally-extending aperture 27 which receives a firing pin 28 of a striker assembly 29 and a lower horizontally-extending aperture 30 which receives a bolt 31. The striker assembly 29 comprises the firing pin 28 and a striker 32. The striker 32 comprises a generally cylindrical body having a flat 33 formed on the forward portion of its right side and terminating in a forwardly-directed rounded shoulder 34 disposed in the vertical plane. The rear portion of the striker 32 has an axially-extending, aperture 36 in which is disposed the forward end of a main spring 37. A main spring guide rod 38 has a head portion 39 adjacent the forward surface of the rear wall 9 and a body portion which extends into the aperture 36 in the striker body 32. The main spring 37 is disposed about the body of the guide rod 38 and one end seats against the end wall of the aperture 36 in the striker 32 while the other end is seated against the head 39 of the guide 38 and therefore biases the striker assembly 29 to its forward position as illustrated in FIGURES 1 and 3 with the firing pin 28 extending through the forward wall 19 of the frame 2 and into the region of the block 3. The firing pin 28 extends into an axially-extending aperture 41 in the forward end of the striker body 32 and may be suitably secured therein by punching or other suitable means. The striker assembly 29 is supported at its forward end by the firing pin 28 and at its back end by the screw 13 which is adapted to extend through the wall 9 and into a recess 35 in the head 39 of the guide 38.

Disposed below and to the right of the striker assembly 29 and located between the walls 9 and 19 is a bolt assembly generally designated by the reference numeral 42. The bolt assembly 42 comprises the bolt 31 and a bolt spring guide assembly 43. The bolt which is illustrated in detail in FIGURES 4a and 4b comprises a generally cylindrical body having an arcuate, downwardly-sloping portion 44 at its forward end which terminates in a transverse lip 46, the upper surface of which lies in a horizontal plane transverse to the axis of the rifle. The bolt 31 has a vertical slot 47 which extends over a substantial portion of its length from the back end and is intersected by a transverse horizontal aperture 48 adapted to receive an operating lever retaining pin 49. A rearward portion of the bolt 31 is provided with a hollow cylindrical aperture adapted to receive a bolt spring 50 and the forward end of a bolt spring guide rod 51. The bolt spring guide rod is integral with and axially aligned with a cylindrical body 52 having a flat 53 on its left side to prevent rubbing between the trigger 17 and the member 52 and has a flat machined on its right side to which is suitably secured, as by brazing, an action shield 54 for purposes to be described subsequently. The shield 54 extends upwardly to approximately the bottom of the head 39 of the main spring guide 38, it being shown cut away in FIGURE 1 so as not to obscure the trigger 17. The body 52 of the bolt spring guide terminates in a rearwardly extending stud 56 seated in a recess in the rear wall 9 of the frame 2, the stud serving to maintain the guide in its proper position.

The bolt 31 when in its forwardmost position locks the block 3 in its closed position, as illustrated in FIGURES 1–3 and in order to release the block 3, a mechanism must be provided for retracting the bolt. The mechanism for retracting the block 31 constitutes an operating lever 57 disposed in the vertical slot 47 in the bolt 31 and pivoted thereto by means of a pin 49 disposed in the apertures 48 in the bolt 31 and a suitable aperture in the lever 57. The lever 57 terminates at its lower end in an arcuate portion 58 which is seated in and rotatable in a narrow slot 59 formed in the bottom wall of the frame 2 and extending into an arcuate portion in the lower rear surface of the wall 19. The upper end of the operating lever 57 terminates in a head portion 61 disposed in line with and immediately forward of the shoulder 34 of the striker body 32. The head portion 61 of the operating lever 57 extends outwardly to the right of the main body of the lever and has secured thereto a transverse extending operating lever pin 62 which is adapted to be engaged by an operating arm 63. The operating arm 63 is pivotally secured to the inner portion of the right hand wall of an action cover 64.

The operating arm 63 constitutes a bell crank having a generally vertical arm 65 connected to a rearwardly and upwardly-extending arm 60. The vertical arm 65 has a vertically-extending elongated slot 75 in which is seated the pin 62 of the operating lever 57. The bell crank is pivoted at the intersection of the arms 65 and 60 about a pin 70 extending through and inwardly from the right wall of the action cover 64. The upper end of the arm 60 is disposed adjacent an arcuate generally extending slot 175 formed in the right side of the action cover and is adapted to be connected to an operating arm handle 80, which is disposed outwardly of the cover 64 and extends through the slot 75 into engagement with the upper end of the arm 60. The shape and size of the arm 63 and the location of the pin 70 are chosen such that when the lever is in its rest position, abutting the rear surface of the wall 19, the operating arm handle is located at the top of the slot 75.

The action cover 64 comprises an inverted generally U-shaped member which is disposed between and snugly engages at its ends the walls 9 and 19. The width of the cover 64 corresponds exactly to the width of the frame and each vertical wall of the U-shaped member 64 is provided with a longitudinally-centrally-disposed, downwardly-depending rectangular tab 66. Each of the tabs 66 is adapted to fit in a rectangular recess 67 formed along each side of the frame 2 intermediate the walls 9 and 19 and an action cover pin 67 is adapted to extend through apertures 68 in the rectangular portion 66 which are aligned with an aperture 69 extending transversely through the frame member 2 centrally of the rectangular cut out portions 67. The action shield 54 is aligned with the slot 75 in the action cover 64 and serves to prevent access to the action through the slot 75 for purposes of safety and appearance.

The trigger 17 completes the action and constitutes a member having a generally horizontal upper member 71 terminating at its back end in the lug 16 by means of which it is supported within the frame 2, and terminating at its forward end in a hook or sear 72 adapted to engage a recess 73 formed in the striker body 32 on its under surface. The rear surface of the sear 72 and the rear wall of the recess 73 extend upwardly and rearwardly so that when the striker body 32 is retracted and the sear 72 of the trigger 17 engages therewith, there is a positive force tending to retain the sear 72 within the recess 73. The trigger 17 further comprises a portion 74 which depends downwardly from the upper member 71 through a longitudinally-extending slot 40 in the bottom wall 20 of the frame 2 to a position below the frame where the trigger has the shape of the conventional rifle trigger as designated by the reference numeral 76. The trigger 17 as reviewed in FIG. 1 is biased to rotate counter-clockwise about the trigger lobe 16 by means of a trigger compression spring 77 which seats in a recess 78 in the rear surface of the member 74 of the trigger. The trigger spring extends from the recess 78 into contact with the forward surface of the vertical wall 9 of the frame assembly.

The trigger 17 is provided with a trigger guard 79 of conventional shape, which is secured to the piece at two locations. The first point of attachment of the guard 79 is forward of the trigger 17 and comprises a screw 81 extending through a vertical aperture in the bottom of the frame 2 and into a threaded recess in the trigger guard 79 forward of the trigger 17. The other point of attachment is provided by a trigger guard stud screw 82 threaded into a recess in the bottom of the rear wall 9 of the frame 2 and having a stud head 90 with a transversely-extending aperture for receiving a trigger guard pin 83. The pin 83 passes through the aperture in the head 90 of the pin 81 and into an aperture in the trigger guard which is aligned with the aperture in the head of the stud 82.

Figure 8:
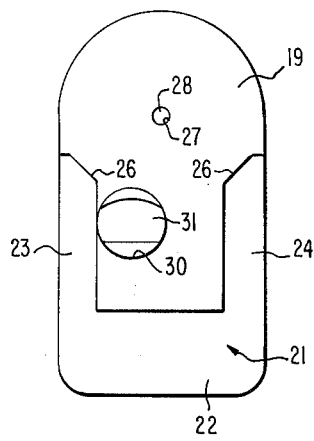
FIGURE 8 is a front elevational view of the frame of the mechanism of the present invention.
Figure 9:
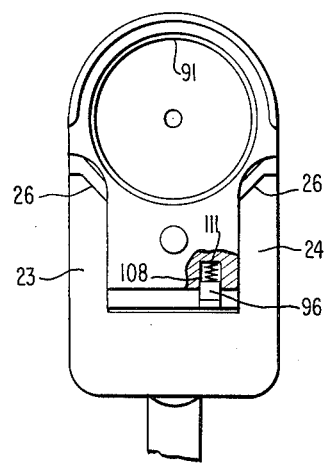
FIGURE 9 is a front elevational view of the block and frame assembly of the apparatus.

Describing now the operation of the firing mechanism of the present invention when it is desired to cock the piece, the operating arm handle 80 is rotated downwardly, that is, counterclockwise about the pin 70 which exerts a rearward pull upon the pin 62 of the operating lever 57. The lever 57 is caused to rotate about the point of contact of its portion 58 and the walls of the slot 59 formed in the frame 2 and pushes rearwardly on the shoulder 34 of the striker body 32 to overcome the force of the main spring 37. Upon the striker body 32 being retracted sufficiently, the recess 73 formed in the bottom of the striker body becomes aligned with the sear 72 of the trigger which enters the recess. The sear 72 engages the rear surface of the recess and maintains the striker body assembly 29 in the retracted position. At this time the end of the firing pin 28 is disposed within the horizontally extending aperture 27 in the front wall 19 of the frame 2. Upon releasing the operating lever, the striker body and firing pin 28 remain in the retracted position, is illustrated in FIGURE 8 of the accompanying drawings, while the bolt spring 49 returns the bolt 31 to its forwardmost position in engagement with the rear surface of the wall 19. When it is desired to fire the piece, the portion 76 of the trigger is pressed rearwardly by the finger causing the trigger to rotate counter-clockwise about the pin 16 thereby retracting the sear 72 from the recess 73 and allowing the main spring 37 to force the striker body and firing pin forward at a relatively high velocity.

The resistance to cocking of the piece and the force with which the firing pin is thrust forward on the firing stroke is determined by the adjustment of the screw 13 which as previously indicated extends through the wall 9 and into the recess 35 in the head of the main spring guide 38. The portion of the screw 13 disposed in the recess 35 in the head 39 defines the rear support for the guide 38 and its adjustment determines the degree of compression in the spring 37 since by forward or rearward movement of the screw 13 and therefore of the head 39 of the guide 38, the maximum length of the spring is decreased or increased.

It will be noted that a mechanical advantage is obtained with the cocking arrangement of the invention, because the arm 60 of the operating arm 63 is longer than the arm 65. Therefore, the piece is relatively easily cocked by a movement of the handle 80.

The trigger 76 is provided with a safety 84 illustrated in detail in FIGURE 7 of the accompanying drawing. The bottom surface of the wall 20 of the frame 2 is provided, just to the rear of the trigger when it is in its uncocked position as illustrated in FIGURES 1 and 3, with a transversely-extending horizontal recess in which is disposed the safety 84. The safety 84 is retained in the aperture in the frame 2 by means of the trigger guard which has a portion behind the trigger extending over the bottom of the rectangular recess in the frame 2. The safety mechanism is provided with a pawl-detent arrangement for determining two distinct positions of the safety 84 transversely of the frame body. Specifically, there is provided a safety spring 85 seated in a vertically-extending recess 86 in the frame immediately above the safety 84 and a ball 87 which is pressed by the spring 85 into distinct grooves 88 formed in the upper surface of the safety 84. The forward edge of the safety 84 is provided with a rectangular recess 89 of the same width as the trigger aperture 40 in the wall 20 and when the safety is shifted toward the left hand side of the body, the recess 89 is aligned with the recess 40. At this time the trigger may be rotated sufficiently to withdraw the sear 72 from the recess 73 formed in the striker body 32. However, with the safety 84 moved to the right, the recess 89 is out of registry with the trigger recess in the body 2 and the trigger cannot be moved rearwardly sufficiently to cause the sear 72 to be retracted from the recess 73.

The advantage of the positioning of the safety immediately to the rear of the trigger and having the safety 84 extending outwardly to the right of the frame 2 when it is on, is that the finger of the operator may be placed on the trigger with the safety on and without removing the finger from the trigger the safety may be pressed with the palm of the hand or that portion of the palm immediately adjacent the knuckle of the trigger finger so as to remove the safety without necessitating removal of the finger from the trigger.

Referring now specifically to the breech block assembly and the ejector mechanism associated therewith, reference is initially made to FIGURES 1, 3, 8, 9 and 10. The block 3 comprises a body having a longitudinal length approximately equal to the longitudinal length of the channel-shaped member 21 of the frame 2 and having an upper longitudinally-extending portion conforming to the outer dimensions of the side walls 23 and 24 of the channel and a lower longitudinally-extending portion which conforms closely to the dimensions of the space between the inner surfaces of the walls of the channel. As previously indicated, the block 3 is rotatably secured to the frame 2 by means of the hinge pin 5 which extends through aligned apertures in the forward ends of the frame 2 and the block 3. The upper portion of the block 3 has a large longitudinally-extending opening generally designated by the reference numeral 91, in FIGURE 9 which is adapted to receive the rear section 92 of the barrel 6. The section 92 of the barrel 6 extends completely to the rear of the block 3 so that when the block is in the position illustrated in FIGURE 3, that is, with the breech closed, the rear vertical surface of the barrel 6 abuts, as does the rear vertical surface of the block 3, the forward surface of the wall 19 of the frame. The barrel 6 may be secured to the block 3 by any suitable means such as brazing or by means of pins 93 which are seated in apertures drilled partly through the block 3 and barrel 6 across the upper and lower surfaces of engagement between these members. The lower portion of the block 3 includes an ejector assembly generally designated by the reference numeral 94 which comprises an ejector hook 96 pivoted about a hook pin 97 extending through aligned apertures in the hook 96 and the lower forward portion of the block 3 adjacent the hinge pin 5. The ejector mechanism 94 further comprises an ejector 98 constituting a horizontally-extending, cylindrical body portion 99 and a right angle hook or head portion 101 which is normally disposed in a groove in the lower back end of the block 3 adjacent the aperture 91. The groove or recess in which the head portion 101 is disposed is such a depth that when the ejector is retracted, the rearward surface of the ejector is aligned with the rearward surface of the block 3. The ejector body 99 is recessed as at 103 to receive a pin 105 which extends transversely through the bottom portion of the block 3 and through the elongated recess 103 to define the forward and rearward limits of movement of the ejector 98. The ejector body 99 is provided with a further recess 104 in its lower surface which is, when the ejector is retracted, aligned with a recess 106 extending through and formed in the lower surface of the block 3 in alignment with the back end of the ejector hook 96. The ejector hook 96 comprises a hook portion 107 which is aligned with and may extend through the aperture 106 in the block 3 and into the recess 104 in the lower surface of the body portion 99 of the ejector 98. The ejector hook 96 is biased for counter-clockwise rotation by means of a spring 108 which presses downwardly upon the end of the ejector hook 96 forwardly of the pin 97 and therefore rotates the hook member 107 of the ejector hook 96 through the recess 106 and into the recess 104 in the ejector 98 to retain the ejector 98 in its retracted position, against the rearward bias applied thereto by means of an ejector spring 109 disposed to press against the forward end of the ejector. The forward end of the ejector hook 96 lies in a vertical slot 111 formed at the forward end of the block 3. The forward portion of the bottom surface of the block 3 is tapered upwardly at a greater angle than the forward portion of the bottom of the ejector hook 96, the taper of the forward lower end of the block being designated by the dotted line bearing the reference numeral 112 in FIGURE 3. Therefore, as more clearly illustrated in FIGURE 9 of the accompanying drawings, the forward end of the ejector hook has its lower portion extending below the bottom surface of the block 3. When the block 3 is released from the bolt 31, in a manner to be described subsequently, the block may be rotated clockwise, as viewed in FIGURE 1, about the hinge pin 5 until the inclined portion of the block designated by the dotted line 112 in FIGURE 3 contacts the inner surface of the bottom wall 22 of the channel 21 of the frame 2. Immediately prior to contact between the inclined portion of the block 3 and the bottom wall 22 of the channel 21, the bottom surface of the ejector pin 96 is pressed against the botom wall of the channel to produce clockwise rotation of the ejector hook 96 thereby to withdraw the hook portion 107 of the ejector hook 96 frm the recess 104 in the ejector. Upon this occurrence, which takes place when the block 3 is in the position illustrated in FIGURE 10, the ejector is released and ejects the shell which is at that time in the barrel, such a shell being illustrated by the reference numeral 113 in FIGURE 3. It now becomes apparent that the forward surfaces 26 of the walls 23 and 24 of the channel 21 are inclined to permit rotation of the block. If the surfaces were not inclined, with the hinge pin 6 located as it is, below the upper surfaces of these walls 23 and 24, it would be impossible to produce anything but very limited rotation of the block 3.

The block 3, as previously indicated, is locked in the breech closed position by the bolt 31. The vertical rear suface of the block 3 is provided with a transversely and horizontally-extending lip or shoulder 144, formed by a groove 115, which is adapted to be engaged by the horizontal surface 46 of the bolt 31 when it is in its forwardmost position into which it is biased by the spring 50. When it is desired to release the block 3, it is necessary to withdraw the bolt 31 and this may be done by movement of the operating lever 57. As previously indicated, upon downward movement of the handle 80 of the operating arm 63, the operating lever 57 is rotated counterclockwise about its arcuate portion 58 disposed in the slot 59 in the lower forward portion of the frame 2. Initially, the head 61 of the operating lever 57 engages the shoulder 34 of the striker body 32 and retracts it sufficiently to cause the sear 72 of the trigger 17 to engage in the recess 73 in the striker body 32 and hold it in cocked position. Since the bolt 31 is also secured to the operating lever 57 above its pivot point, it is moved rearwardly upon counterclockwise rotation of the lever, but since it is disposed closer to the pivot point of the lever than the striker body 32, its rearward movement is considerably less than the latter member and therefore cocking of the piece may be affected without withdrawing the bolt 31 sufficiently to disengage the shoulder 46 of the bolt from the locking lip or shoulder 114 of the block 3. Specifically, when the operating lever 57 has been retracted sufficiently to cock the piece the rear surface of the operating lever and the forward surface of the bolt 31 assume the position illustrated in FIGURE 6 by the dotted lines 116 and 117, respectively. However, upon rotation of the operating arm 63 to a degree greater than that required to cock the piece, the apparatus assumes the position illustrated in FIGURE 10 and the surface 46 of the bolt 31 is withdrawn completely from the region of the holding shoulder 114 of the block 3 and the block may readily be rotated about the hinge pin 6.

It becomes apparent therefore that the same operating arm 63 is utilized for both cocking the mechanism and for releasing the block 3 in order to break the gun and allow access to the barrel for insertion of a new shell or ejection by the ejector 98 of an old shell. This use of the single lever which first cocks the piece and then releases the breech provides a high degree of safety, since the firing pin is retracted and held in the wall member 19, by operation of the sear 72, before the breech can be opened. Such operation eliminates the possibility of the firing pin being in a position to strike the primer portion of the shell while the breech is still open, or more particularly while the breech is being closed. A further feature of this arrangement is that, should the trigger be pulled while the breech is not locked but closed sufficiently to bring the shell into the region of the firing pin, the firing pin cannot be propelled forward sufficiently to strike the shell. The head portion 61 of the operating lever 57 is the member which produces cocking of the piece. Also, if the block 3 is not in its position but has been rotated into its normal position to such a degree that a shell would be in the region of the firing pin, then the portion of the block 3 adjacent the lip 114 or immediately below the lip 114 has contacted the upper curved surface of the bolt 31 and has pushed it back to a certain extent, it being obvious that the bolt must be completely pushed back by this surface when it is wished to close the breech. With the bolt 31 partially pushed back by the breech, when it is almost closed, the operating lever 57 is rotated away from the wall 19 and the head portion 61 is rotated into the path of movement of the shoulder 34 of the striker mechanism 32. Therefore, one of two things must happen under these circumstances, either the shoulder 34 in striking the head portion 61 under the force of the main spring 37 will ram the bolt home or if the bolt cannot be forced into its fully closed position, the head portion 61 prevents full forward movement of the shoulder 34 and therefore the firing pin 28 and prevents the firing pin from contacting the shell. Thus, the use of the single operating lever for cocking and breech unlocking purposes serves the further function of a safety mechanism for preventing the firing pin from striking a shell when the breech is not fully closed.

The apparatus provided by the present invention is extremely simple and all of the action parts are rendered readily accessible by removal of the action cover 64. It is seen that the only operating parts described which are not rendered readily accessible by the removal of the block from the frame which is accomplished by the simple removal of the hinge pin 6 while the safety mechanism which would very rarely give trouble may be reached by simply removing the trigger guard. Another feature of importance is the fact that the main spring compression can be adjusted by simply removing the stock and thereafter manipulating the screw 13. Further advantages of the apparatus of the invention result from the arrangement for supporting the trigger which produces a large mechanical advantage permitting the trigger to be easily operated. The ease of actuation of the trigger in combination with the ease of cocking the piece renders the apparatus particularly useful in training beginners, many of whom are children and do not have the strength to operate conventional mechanisms. Also, the extreme simplicity of parts and their mounting within the action portion of the frame renders the apparatus economical and easily susceptible of repair or replacement of parts if necessary.

Another important feature of the apparatus is the method of supporting the barrel within the block 3. It is apparent that the block 3 may accept a number of different gauge or size barrels so long as their outer dimensions are proper. The gauge of the barrel affects only its inner diameter within reason, of course. Therefore, only a single size block need be stocked by the manufacturer and the eventual gauge of the meachnism is determined only when the barrel is inserted. Another important advantage of the invention is the fact that the frame and breech assemblies provided are in weight, size, balance and general physical arrangement quite similar to the corresponding units of an automatic or pump action shotgun and therefore the apparatus of the invention may utilize the barrels, stocks and forearms of the more expensive and complex units thereby further reducing the manufacturing and inventory costs of the manufacture.

The action of this invention makes it possible for manufacturers to warehouse the action and thereby save both warehouse space and the normal high investment in shotgun inventory. That is to say, orders may call for varying gauges, barrel lengths, barrel types (plain, rib, ventilated rib), muzzle chokes, fore-end or stock types, etc. To meet such demands the manufacturer, prior to starting production, must attempt to forecast the demands for the innumerable variations, and then make up guns in accordance with these estimates. If the customer's choice is not in stock a long wait may result and the order may be cancelled.

With the action of this invention special orders may always be expedited. As an example, barrels may be carried in 32 inch lengths and cut back to 28, 26, or similar lengths when ordered, and then installed. Chokes can be swedged into these barrels without trouble at the time of assembly. Special ribs can be mounted as ordered and stock alterations can be made from custom or subcontract facilities if desired.

In addition to the foregoing, the actions of this invention may themselves be sold commercially. Such a procedure allows gunsmiths, both professional and amateur, to barrel and stock their own gun designs for both general and experimental use.

While the action of the invention has been discussed in connection with its usage for shotguns, it may also be used for barreling with special high power rifle barrels. It is currently common to provide actions for single shot experimental hand loaded cartridges in this country and most of the actions provided for this purpose are of the turn bolt or dropping block type. The frame pattern of the instant invention, because of the metal bulk of the frame and block, will allow use of higher powered rifle cartridges of the experimental type than any rifle action currently available.

Although one specific embodiment of the invention has been described and illustrated, it will be clear that variations of the details of construction which are specifically illustrated and described may be restorted to without departing from the true spirit and scope of the invention as defined in the appended claims.

What is claimed is:

1. A frame and block assembly for firearms comprising a frame having at least a front wall and a channel-shaped member extending forward from said front wall, said channel-shaped member comprising a pair of side walls and a bottom wall, a block approximately coextensive with said channel-shaped member and having an upper portion with an axially-extending aperture, a barrel detachably secured in said aperture, said block having a lower portion disposed between said side walls of said frame, a removable hinge pin extending through aligned apertures in said side walls and said lower portion of said block adjacent the forward ends thereof, said lower portion of said block having a rear wall adjacent said front wall, said rear wall having a transverse groove extending at least partially between said side walls, a reciprocatable bolt extending through an axially-extending aperture in said front wall, said bolt having a shoulder aligned with and adapted to seat in the groove in said block and a spring for biasing said shoulder into said groove.

2. The combination in accordance with claim 1, further comprising an axially-extending, vertical slot in said bolt rearwardly of said front wall, an operating lever disposed in said slot and terminating said bolt in a slot in said frame, a pin extending through transversely aligned apertures in said bolt and said operating lever about which the lever is adapted to be rotated, and an operating arm for rotating said operating lever about said pin and away from said front wall.

References Cited by the Examiner

UNITED STATES PATENTS

| | | | |
|---|---|---|---|
| 756,039 | 3/1904 | Mossberg | 42—44 |
| 1,035,940 | 8/1912 | Baker | 42—47 |
| 1,299,189 | 4/1919 | Johnson | 42—44 |
| 1,624,879 | 4/1927 | Smith | 42—44 |
| 1,728,823 | 9/1929 | Delu | 42—47 |
| 2,225,583 | 12/1940 | Blizard | 42—70 |
| 2,458,616 | 1/1949 | Maynor | 42—70 |

BENJAMIN A. BORCHELT, *Primary Examiner.*